(12) United States Patent
Stoll et al.

(10) Patent No.: US 7,044,259 B2
(45) Date of Patent: May 16, 2006

(54) HYDRAULIC TRANSMISSION FOR DRIVING AND STEERING WHEELS

(76) Inventors: Kerwyn Stoll, 8565 Old State Rd., Mattoon, IL (US) 61938-9093; Norihiro Ishii, c/o Kanzaki Kokyukoki Mfg. Co., Ltd., 18-1, Inadera 2-Chome, Amagasaki-shi, Hyogo 661-0981 (JP)

( * ) Notice: Subject to any disclaimer, the term of this patent is extended or adjusted under 35 U.S.C. 154(b) by 117 days.

(21) Appl. No.: 10/410,145

(22) Filed: Apr. 10, 2003

(65) Prior Publication Data
US 2004/0200657 A1    Oct. 14, 2004

(51) Int. Cl.
*B60K 17/356* (2006.01)
(52) U.S. Cl. .................. 180/307; 180/308; 180/242
(58) Field of Classification Search ............... 180/305, 180/307, 308, 6.48, 6.3
See application file for complete search history.

(56) References Cited

U.S. PATENT DOCUMENTS

| | | | | |
|---|---|---|---|---|
| 3,595,334 | A | * | 7/1971 | Issac .......................... 180/197 |
| 3,637,036 | A | * | 1/1972 | Swisher et al. ............. 180/307 |
| 3,641,765 | A | * | 2/1972 | Hancock et al. ............. 60/484 |
| 3,656,570 | A | * | 4/1972 | Gortnar et al. ............ 180/6.48 |
| 3,823,792 | A | * | 7/1974 | Dinkloh et al. ............ 180/14.3 |
| 3,841,423 | A | * | 10/1974 | Holtkamp et al. ........... 180/6.3 |
| 3,858,675 | A | * | 1/1975 | Geis ........................... 180/307 |
| 3,865,208 | A | * | 2/1975 | Crawshay et al. ......... 180/6.48 |
| 3,900,075 | A | * | 8/1975 | Chichester et al. .......... 180/6.3 |
| 3,910,369 | A | * | 10/1975 | Chichester et al. ........ 180/6.32 |
| 3,916,625 | A | * | 11/1975 | Holtkamp .................... 60/421 |
| 3,978,937 | A | * | 9/1976 | Chichester et al. .......... 180/242 |
| 4,402,181 | A | * | 9/1983 | Acker et al. .................. 60/427 |
| 5,427,195 | A | * | 6/1995 | Paul et al. .................. 180/308 |
| 5,819,870 | A | * | 10/1998 | Braun ........................ 180/305 |
| 5,823,284 | A | * | 10/1998 | Hoar et al. .................. 180/240 |

(Continued)

FOREIGN PATENT DOCUMENTS

WO    WO 00/01569    1/2000

*Primary Examiner*—Christopher P Ellis
*Assistant Examiner*—Bridget Avery
(74) *Attorney, Agent, or Firm*—Sterne, Kessler, Goldstein & Fox P.L.L.C.

(57) ABSTRACT

In a hydraulic transmission for driving and steering wheels of a vehicle, which has at least a first pair of laterally disposed wheels, a first hydraulic pump is operatively connected to a driving source with inlet/outlet ports respectively and fluidly connected to a high pressure side and a low pressure side of the parallel fluid passages. A second hydraulic pump is operatively connected to the driving source and having inlet/outlet ports respectively and fluidly connected to high and low pressure sides of the fluid passages between the second pair of hydraulic motors. The first hydraulic pump is of a variable displacement type that varies the amount of hydraulic fluid to be discharged and supplied, based upon the displacement amount of a first output adjustment member, in which the displacement amount is varied by operating the first output adjustment member via a driving-speed operation member. The second hydraulic pump is of a variable displacement type that varies the amount of hydraulic fluid to be discharged and sucked, based upon the displacement amount of a second output adjustment member, in which the displacement amount is varied by operating the second output adjustment member via a steering operation member. Rotational power is input from each of the second pair of hydraulic motors to a corresponding one of the output shafts of the first pair of hydraulic motors by a magnitude corresponding to the operational amount of the steering operation member in a different rotational direction from each other.

20 Claims, 8 Drawing Sheets

U.S. PATENT DOCUMENTS

| | | | | |
|---|---|---|---|---|
| 5,848,664 A | * | 12/1998 | Kaspar | 180/308 |
| 6,062,332 A | * | 5/2000 | Stephenson et al. | 180/305 |
| 6,230,829 B1 | * | 5/2001 | Martin et al. | 180/6.3 |
| 6,276,468 B1 | * | 8/2001 | Essig et al. | 180/6.2 |
| 6,305,486 B1 | * | 10/2001 | Polzin et al. | 180/308 |
| 6,321,866 B1 | * | 11/2001 | Prohaska | 180/307 |
| 6,354,392 B1 | * | 3/2002 | Cousin et al. | 180/242 |
| 6,663,114 B1 | * | 12/2003 | Lamela et al. | 280/6.15 |
| 6,808,036 B1 | * | 10/2004 | Pellenc | 180/197 |
| 6,904,993 B1 | * | 6/2005 | Rinck et al. | 180/244 |

\* cited by examiner

F I G . 3
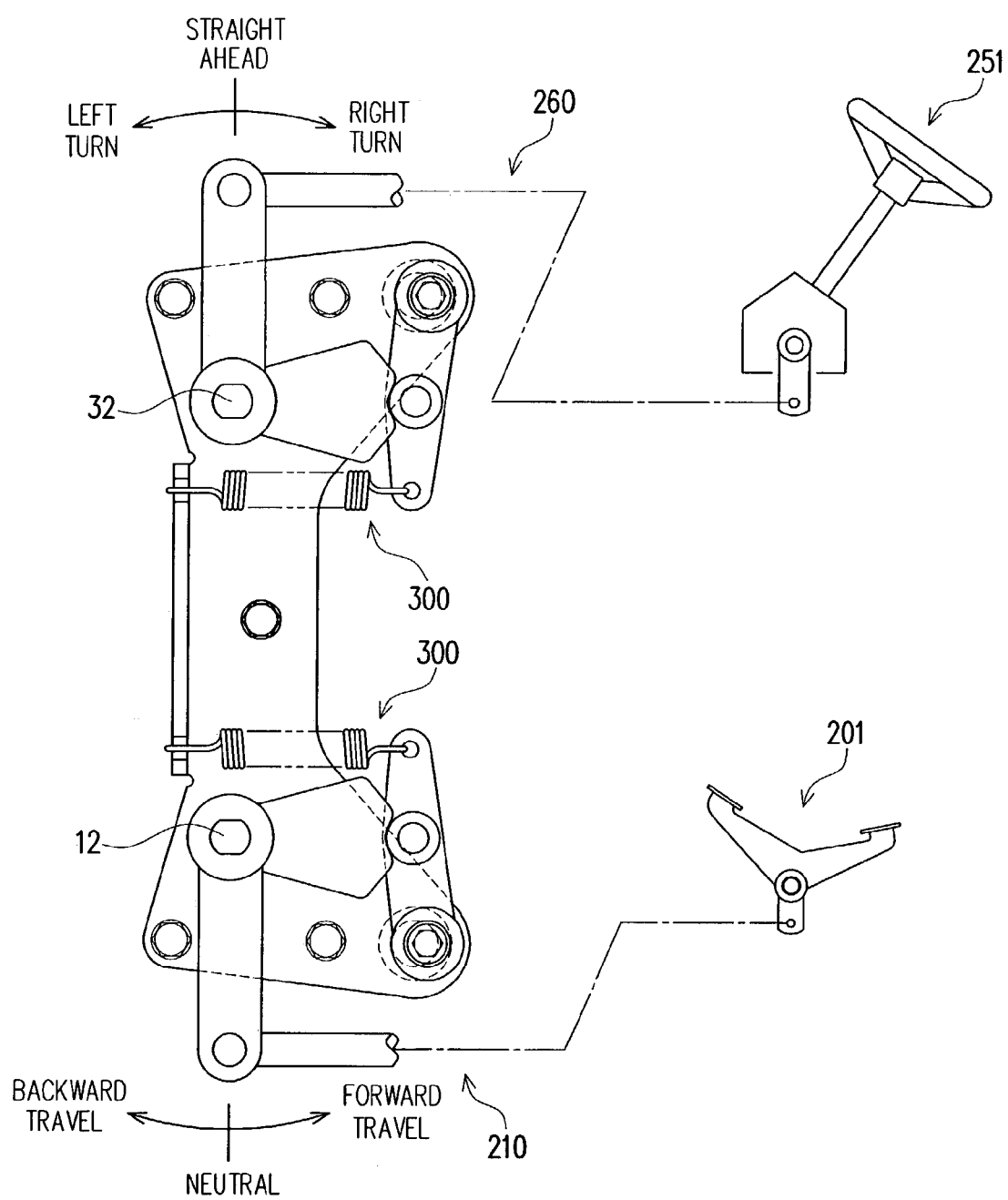

HYDRAULIC TRANSMISSION FOR DRIVING AND STEERING WHEELS

BACKGROUND OF THE INVENTION

1. Field of the Invention

The present invention relates to a hydraulic transmission with a hydraulic pump and a hydraulic motor fluidly connected thereto for driving and steering wheels.

2. Related Art

Up to the present, various hydraulic transmissions, which are capable of steering driving wheels of a vehicle while driving the same by fluidly connected hydraulic pump and hydraulic motor have been proposed. For example, PCT Application Publication No. WO00/01569 discloses a hydraulic transmission of this type, which includes a first HST (Hydrostatic Transmission) having a first variable displacement hydraulic pump operatively connected to a driving source and a first hydraulic motor fluidly connected to the first variable displacement hydraulic pump, and a second HST having a second variable displacement hydraulic pump operatively connected to the driving source and a second hydraulic motor fluidly connected to the second variable displacement hydraulic pump, in which an output shaft of the first hydraulic motor is connected to a pair of driving axles via a first differential unit, and an output shaft of the second hydraulic motor is operatively connected to the pair of driving axles via a second differential unit.

In the thus arranged hydraulic transmission, the first HST acts to transmit power with its speed variable to both a pair of driving wheels, while the second HST acts to steer both the pair of driving wheels. This arrangement can achieve an improved operability and the like, as compared with the other type of the hydraulic transmission, in which both a pair of the HSTs are used in order to drive respectively the left and right driving wheels with variable speed.

Thus, the hydraulic transmission as disclosed in the above PCT International Publication has an advantageous effect than a conventional hydraulic transmission, but is also disadvantageous in the following respects.

That is, the hydraulic transmission necessitates the fully independent paths, which respectively constitute the first HST for driving the wheels with variable speed and the second HST for steering the wheels, and therefore requires to provide such as gear transmission mechanisms including differential units, their associated parts and housings for accommodating these members between the first HST and the pair of the output shafts, as well as between the second HST and the pair of the output shafts. As a result, a layout possibility of the vehicle is limited and hence design flexibility is deteriorated.

In consideration of the above prior art, it is an object of the present invention to provide a hydraulic transmission equipped with the fluidly connected hydraulic pump and hydraulic motor, which is simple in construction and capable of transmitting power to the driving wheels with variable speed and steering the same, as well as achieving improved design flexibility in the layout of the vehicle.

SUMMARY OF THE INVENTION

According to a first aspect of the present invention, there is provided a hydraulic transmission for driving and steering wheels of a vehicle, which has at least a first pair of laterally disposed wheels. The hydraulic transmission includes: a first pair of hydraulic motors having output shafts respectively and drivingly connected to the first pair of laterally disposed wheels, and having inlet/outlet ports fluidly connected to each other with parallel fluid passages; a second pair of hydraulic motors having output shafts each operatively connected to a corresponding one of the output shafts of the first pair of hydraulic motors, and having inlet/outlet ports fluidly connected to each other with fluid passages; a first hydraulic pump operatively connected to a driving source and having inlet/outlet ports respectively and fluidly connected to a high pressure side and a low pressure side of the parallel fluid passages; and a second hydraulic pump operatively connected to the driving source and having inlet/outlet ports respectively and fluidly connected to a high pressure side and a low pressure side of the fluid passages between the second pair of hydraulic motors. The first hydraulic pump is of a variable displacement type that varies the amount of hydraulic fluid to be discharged and supplied, based upon the displacement amount of a first output adjustment member, in which the displacement amount is varied by operating the first output adjustment member via a driving-speed operation member. The second hydraulic pump is of a variable displacement type that varies the amount of hydraulic fluid to be discharged and sucked, based upon the displacement amount of a second output adjustment member, in which the displacement amount is varied by operating the second output adjustment member via a steering operation member. Rotational power is input from each of the second pair of hydraulic motors to a corresponding one of the output shafts of the first pair of hydraulic motors by a magnitude corresponding to the operational amount of the steering operation member in a different rotational direction from each other.

Preferably, the inlet/outlet ports of the second pair of hydraulic motors are connected to each other with crossed fluid passages, and the direction in which power is transmitted from one of the output shafts of the second pair of hydraulic motors to a corresponding one of the output shafts of the first pair of hydraulic motors is the same as the direction in which power is transmitted from the other of the output shafts of the second pair of hydraulic motors to the other of the output shafts of the first pair of hydraulic motors.

Preferably, the inlet/outlet ports of the second pair of hydraulic motors are connected to each other with parallel fluid passages, and the direction in which power is transmitted from one of the output shafts of the second pair of hydraulic motors to a corresponding one of the output shafts of the first pair of hydraulic motors is opposite to the direction in which power is transmitted from the other of the output shafts of the second pair of hydraulic motors to the other of the output shafts of the first pair of hydraulic motors.

Preferably, the vehicle further has a second pair of laterally disposed wheels, and the output shafts of the second pair of hydraulic motors are respectively and drivingly connected to the second pair of laterally disposed wheels.

Preferably, the vehicle further has a second pair of laterally disposed wheels, and the output shafts of the first pair of hydraulic motors are respectively and drivingly connected to the second pair of laterally disposed wheels.

Preferably, the first hydraulic pump is provided with a neutral-position return mechanism for returning the first output adjustment member to a neutral position thereof when the driving-speed operation member has been released from the operational state.

Preferably, the second hydraulic pump is provided with a neutral-position return mechanism for returning the second output adjustment member to a neutral position thereof when the steering operation member has been released from the operational state.

Preferably, the first and second hydraulic pumps are accommodated within a common pump housing so as to together constitute a hydraulic pump unit.

Preferably, the hydraulic pump unit includes a PTO unit.

Preferably, the hydraulic transmission further includes a charge pump for being operatively driven by the driving source.

According to a second aspect of the present invention, there is provided a hydraulic transmission equipped with a first HST and a second HST, into which driving force from a driving source is input, so as to drive and steer wheels of a vehicle, the vehicle having at least a first pair of laterally disposed wheels. The first HST includes: a first hydraulic pump operatively connected to the driving source, in which the first hydraulic pump is of a variable displacement type that varies the amount of hydraulic fluid to be discharged and supplied, based upon the displacement amount of a first output adjustment member, and the displacement amount is varied by operating the second output adjustment member via a driving-speed operation member; a first pair of hydraulic motors having output shafts respectively and drivingly connected to the first pair of laterally disposed wheels, and having inlet/outlet ports fluidly connected to each other with first parallel fluid passages; and first conduits for fluid connection between inlet/outlet ports of the first hydraulic pump and the first parallel fluid passages. The second HST includes: a second hydraulic pump operatively connected to the driving source, in which the second hydraulic pump is of a variable displacement type that varies the amount of hydraulic fluid to be discharged and supplied, based upon the displacement amount of a second output adjustment member, the displacement amount is varied by operating the second output adjustment member via a steering operation member; a second pair of hydraulic motors having output shafts each operatively connected to a corresponding one of the output shafts of the first pair of hydraulic motors, and having inlet/outlet ports fluidly connected to each other with second fluid passages; and second conduits for fluid connection between inlet/outlet ports of the second hydraulic pump and the second fluid passages. Rotational power is input from each of the output shafts of the second pair of hydraulic motors to a corresponding one of the output shafts of the first pair of hydraulic motors by a magnitude corresponding to the operational amount of the steering operation member in a different rotational direction from each other.

Preferably, the second fluid passages are designed so as to connect the inlet/outlet ports of the second pair of hydraulic motors in a crosswise manner to each other, and the hydraulic transmission further includes: a first power transmission mechanism for operatively connecting one of the output shafts of the second pair of hydraulic motors to a corresponding one of the output shafts of the first pair of hydraulic motors, enabling them to be operated in association with each other; and a second power transmission mechanism for operatively connecting the other of the output shafts of the second pair of hydraulic motors to the other of the output shafts of the first pair of hydraulic motor, enabling them to be operated in association with each other; in which the power transmission direction of the first power transmission mechanism is the same as that of the second power transmission mechanism.

Preferably, the second fluid passages are designed so as to connect the inlet/outlet ports of the second pair of hydraulic motors in parallel to each other; and the hydraulic transmission further includes: a first power transmission for operatively connecting one of the output shafts of the second pair of hydraulic motors to a corresponding one of the output shafts of the first pair of hydraulic motors, enabling them to be operated in association with each other; and a second power transmission for operatively connecting the other of the output shafts of the second pair of hydraulic motors to the other of the output shafts of the first pair of hydraulic motors, enabling them to be operated in association with each other, in which the power transmission direction of the first power transmission mechanism is different from that of the second power transmission mechanism.

Preferably, the vehicle further has a second pair of laterally disposed wheels, and the output shafts of the second pair of hydraulic motors are respectively and drivingly connected to the second pair of laterally disposed wheels.

Preferably, the vehicle further has a second pair of laterally disposed wheels, and the output shafts of the first pair of hydraulic motors are respectively and drivingly connected to the second pair of laterally disposed wheels.

Preferably, the first hydraulic pump is provided with a neutral-position return mechanism for returning the first output adjustment member to a neutral position thereof when the driving-speed operation member has been released from the operational state.

Preferably, the second hydraulic pump is provided with a neutral-position return mechanism for returning the second output adjustment member to a neutral position thereof when the steering operation member has been released from the operational state.

Preferably, the first and second hydraulic pumps are accommodated within a common pump housing so as to together constitute a hydraulic pump unit.

Preferably, the hydraulic pump unit includes a PTO unit.

Preferably, the hydraulic transmission further includes a charge pump for being operatively driven by the driving source.

BRIEF DESCRIPTION OF THE DRAWINGS

The above, and other objects, features and advantages of the present invention will become apparent from the detailed description thereof in conjunction with the accompanying drawings wherein.

FIG. 3 is a model view illustrating an operation link mechanism between first and second hydraulic pumps in the vehicle of FIG. 1.

DETAILED DESCRIPTION OF THE PREFERRED EMBODIMENT

First Embodiment

Figure 1:
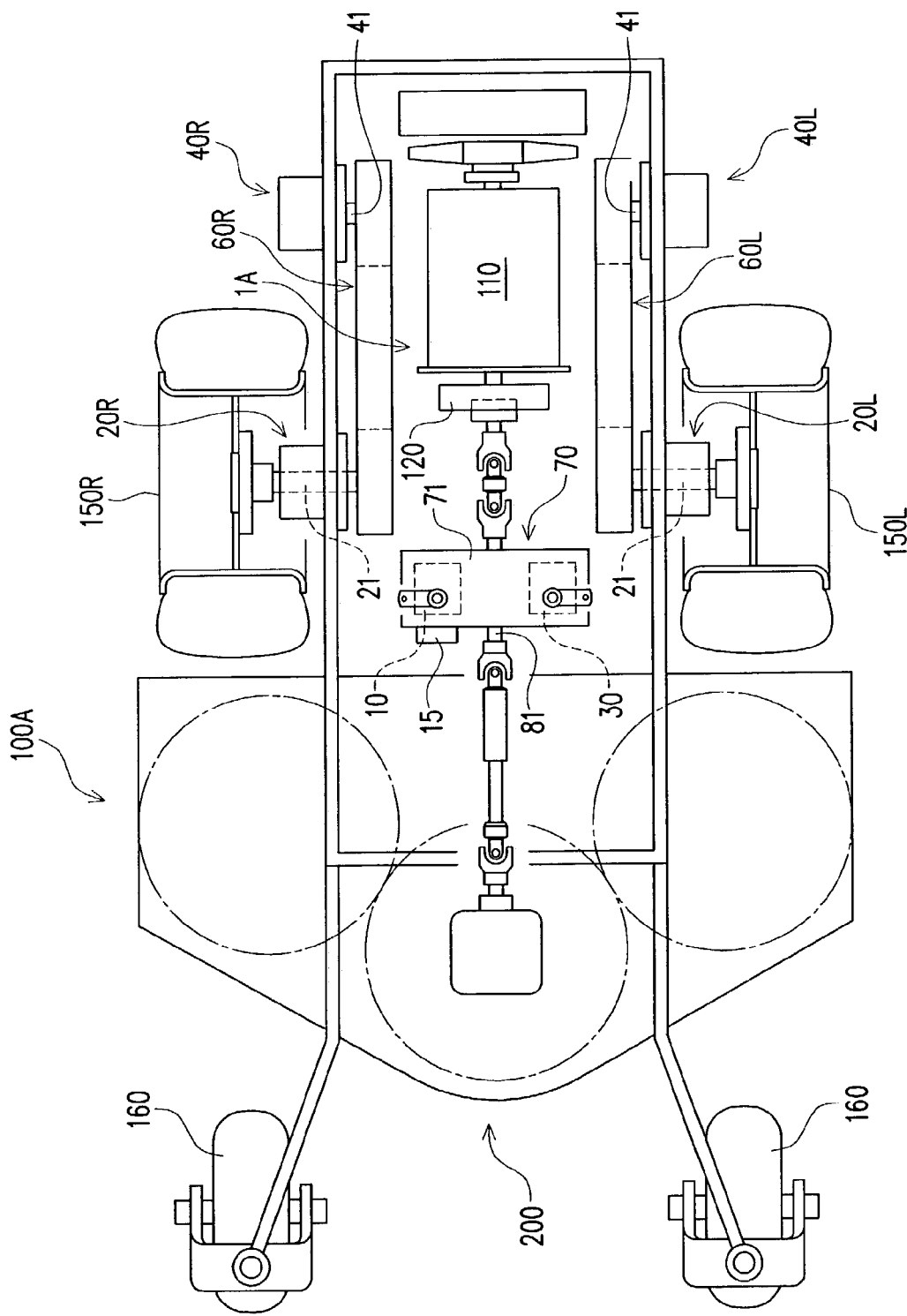
FIG. 1 is a plan model view of a vehicle, to which a hydraulic transmission of a first embodiment of the present invention has been applied.
Figure 2:
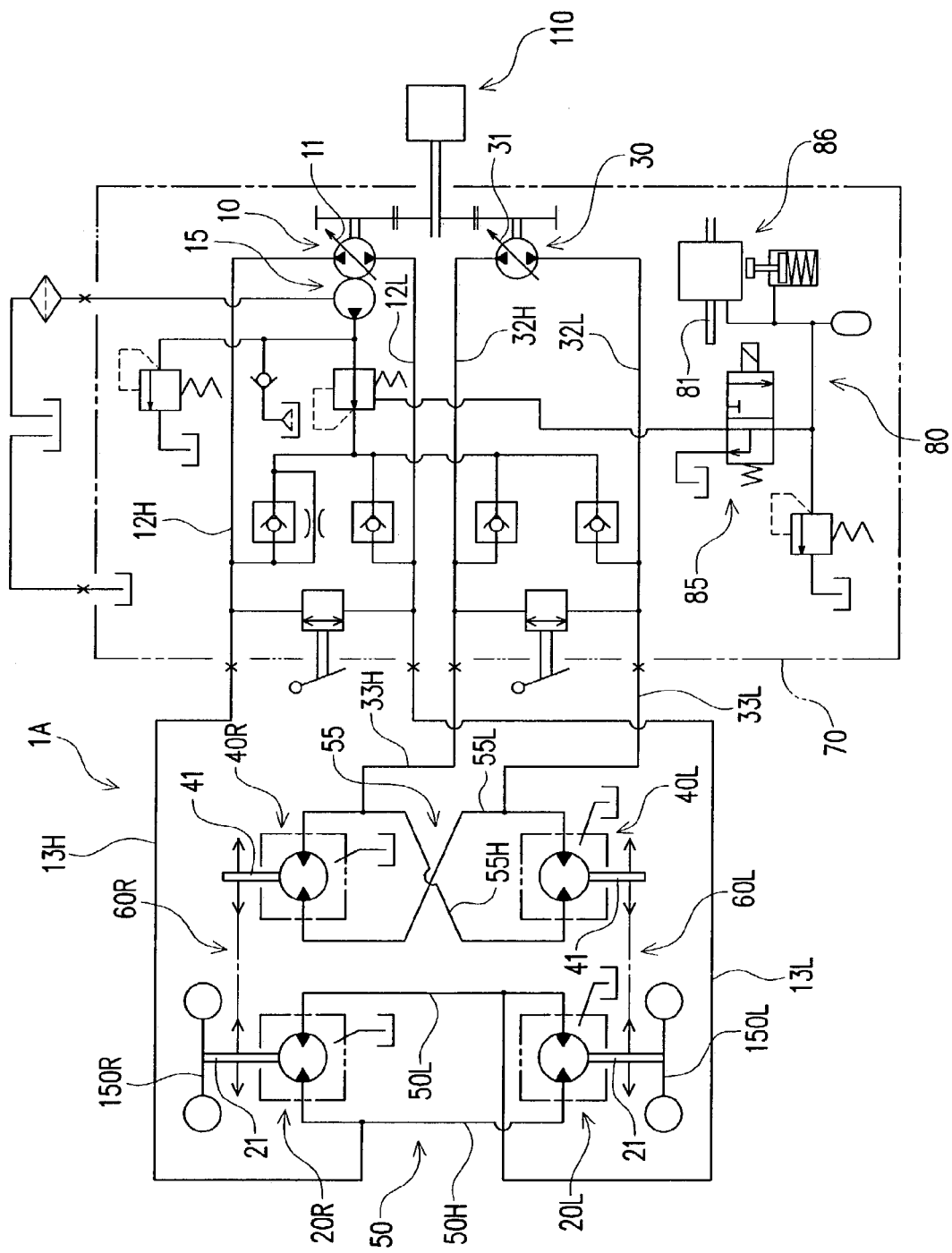
FIG. 2 is a hydraulic circuit diagram of the hydraulic transmission according to the first embodiment.

The description will be made for the hydraulic transmission according to the first embodiment of the present invention with reference to the accompanied drawings. FIG. 1 is a plan model view illustrating vehicle 100A with hydraulic transmission 1A. FIG. 2 is a hydraulic circuit diagram of the hydraulic transmission 1A.

As illustrated in FIGS. 1 and 2, the hydraulic transmission 1A includes first hydraulic pump 10 and second hydraulic pump 30 which are operatively connected to driving source 110, a first pair of hydraulic motors 20 fluidly connected to the first hydraulic pump 10, and a second pair of hydraulic motors 40 fluidly connected to the second hydraulic pump 30. In FIG. 1, reference numeral 120 represents a flywheel connected to an output end of the driving source 110.

The first pair of hydraulic motors 20 have output shafts 21 respectively and drivingly connected to a first pair of laterally disposed wheels 150 (right and left rear wheels in this embodiment). Specifically, the first pair of hydraulic motors 20 include right hydraulic motor 20R (referred to as "right first hydraulic motor" hereinafter) for driving a right wheel (referred to as "right first wheel" hereinafter) 150R of the first pair of wheels 150 and left hydraulic motor 20L (referred to as "left first hydraulic motor" hereinafter) for driving a left wheel (referred to as "left first wheel" hereinafter) 150L of the first pair of wheels 150.

The first pair of hydraulic motors 20 are designed to be capable of driving the right and left first wheels 150L, 150R in the same direction at the same speed in cooperation with the first hydraulic pump 10. Specifically, the first pair of hydraulic motors 20 have inlet/outlet ports which are fluidly connected to each other via parallel fluid passages 50. Fluid passage 50H and fluid passage 50L of the parallel fluid passages 50 are fluidly connected to inlet/outlet ports 12H, 12L of the first hydraulic pump 10 via conduits 13H, 13L. Thus, the first hydraulic pump 10 and the first pair of hydraulic motors 20 are fluidly connected to each other to together constitute a first HST.

The first hydraulic pump 10 is of a variable displacement type that is capable of varying the discharge direction and discharge amount of hydraulic fluid based upon the operation of a driving-speed operation member, which is operatively connected to output adjustment member 11 such as a movable swash plate, which is used for such as an axial piston type hydraulic pump, in such a manner as to be operable from the outside. With this arrangement, the right and left first wheels 150R, 150L can be driven in the same direction at the same speed by tilting the output adjustment member 11 from a neutral position to a fist side or a second side. Specifically, by tilting the output adjustment member 11 from the neutral position to the first side, hydraulic fluid is discharged through the inlet/outlet port 12H of the first hydraulic pump 10, thereby allowing the fluid passage 50H of the parallel passages 50 to have high pressure and the fluid passage 50L to have low pressure. Accordingly, the right and left first wheels 150R, 150L are both rotated in a first direction (a rotational direction, for example, enabling the vehicle to travel forward) at the same speed.

On the other hand, by tilting the output adjustment member 11 from the neutral position to the second side, hydraulic fluid is discharged through the inlet/outlet port 12L of the first hydraulic pump 10, thereby allowing the fluid passage 50L of the parallel passages 50 to have high pressure and the fluid passage 50H to have low pressure. Accordingly, the right and left first wheels 150R, 150L are both rotated in the second direction (a rotational direction, for example, enabling the vehicle to travel backward) at the same speed.

The second pair of hydraulic motors 40 have output shafts 41 operatively and correspondingly connected to output shafts 21 of the first pair of hydraulic motors 20. Specifically, the second pair of hydraulic motors 40 include right hydraulic motor (referred to as "right second hydraulic motor" hereinafter) 40R and left second hydraulic motor (referred to as "left second hydraulic motor" hereinafter) 40L, whose output shafts 41 are operatively connected to the output shafts 21 of the right and left first hydraulic motors 20R, 20L respectively via power transmission mechanisms 60 each comprising such as a gear train, the combination of pulleys and a belt, or the combination of sprockets and chain.

The second pair of hydraulic motors 40 together constitute a second HST in cooperation with the second hydraulic pump 30. Specifically, the second pair of hydraulic motors 40 have inlet/outlet ports fluidly connected to each other via fluid passages 55. Fluid passage 55H and fluid passage 55L of the fluid passages 55 are respectively and fluidly connected to inlet/outlet ports 32H, 32L of the second hydraulic pump 30 via conduits 33H, 33L.

Likewise to the first HST, the second HST is capable of varying the output based upon the operation of a steering operation member, which is operatively connected to an output adjustment member 31 such as a movable swash plate. That is, the second hydraulic pump 30 is capable of varying the discharge direction and discharge amount of hydraulic fluid based upon the displacement amount of the output adjustment member 31.

Further, the hydraulic transmission 1A of this embodiment is arranged so that rotational power is input from each of the second pair of hydraulic motors 40 to a corresponding one of the output shafts of the first pair of hydraulic motors 20 at the same speed corresponding to the operational amount of the steering operation member in a direction opposite to each other.

Specifically, the fluid passages 55 for fluid connection between the second pair of hydraulic motors 40 are designed to connect the respective inlet/outlet ports of the second pair of hydraulic motors 40 in a crosswise manner to each other (see FIG. 2).

With the above arrangement, by tilting the output adjustment member 31 from the neutral position to the first side, hydraulic fluid is discharged through the inlet/outlet port 32H of the second hydraulic pump 30, thereby allowing the fluid passage 55H of the fluid passages 55 to have high pressure and the fluid passage 55L to have low pressure. Accordingly, output shaft 41R of the right second hydraulic motor 40R and output shaft 41L of the left second hydraulic motor 40L are rotated respectively in the first and second directions at the same speed.

On the other hand, by tilting the output adjustment member 11 from the neutral position to the second side, hydraulic fluid is discharged through the inlet/outlet port 32L of the first hydraulic pump 30, thereby allowing the fluid passage 55L of the fluid passages 55 to have high pressure and the fluid passage 50H to have low pressure. Accordingly, the output shaft 41R of the right second hydraulic motor 40R and the output shaft 41L of the left second hydraulic motor 40L are rotated respectively in the second and first directions at the same speed.

Further, the power transmission mechanisms 60 for operative connections between the output shafts 41 of the second pair of hydraulic motors 40 and the output shafts 21 of the first pair of hydraulic motors 20 are rotated in the same direction as each other. That is, left power transmission mechanism 60L for operative connection between the output shaft 41 of the left second hydraulic motor 40L and the output shaft 21 of the left first hydraulic motor 20L has the same structure as that of right power transmission mechanism 60R for operative connection between the output shaft 41 of the right second hydraulic motor 40R and the output shaft 21 of the right first hydraulic motor 20R.

The thus arranged hydraulic transmission 1A enables the vehicle to non-stepwisely change the driving speed, change the travel direction and turn on a zero turn radius through a simple construction, in which the general purpose hydraulic pumps 10, 30 and hydraulic motors 20, 40 are respectively mounted on the vehicle frame and fluidly connected to each other via conduits, and the corresponding output shafts of the first and second pairs of hydraulic motors 20, 40 are operatively connected to each other via the simple power transmission mechanisms 60 such as in the form of belts, chains or gear trains.

That is, the hydraulic transmission 1A of this embodiment can omit the necessity to dispose a complicated gear mechanism such as a differential unit, which is needed in a conventional hydraulic transmission, and hence a bulky housing for accommodating such a mechanism on the vehicle frame. As a result, the limitation in vehicle layout can be reduced and therefore the most proper layout for each vehicle can be achieved.

Preferably, the hydraulic transmission 1A includes charge pump 15 that is operatively driven by the driving source 110. In this embodiment, the charge pump 15 is driven by a pump shaft of the first hydraulic pump 10. Pressurized hydraulic fluid discharged from the charge pump 15 is supplied as charge fluid to the first HST made up of the first hydraulic pump 10 and the first pair of hydraulic motors 20, as well as to the second HST made up of the second hydraulic pump 30 and the second pair of hydraulic motors 40 (see FIG. 2).

Preferably, as illustrated in FIG. 1, it is possible to provide hydraulic pump unit 70, which has common pump housing 71, in which the first hydraulic pump 10 and the second hydraulic pump 30 are placed. That is, the hydraulic pump unit 70 may be constructed so that driving force from the driving source 110 is input into the first and second hydraulic pumps 10, 30 via plural gears placed in the pump housing 71. This type of the hydraulic pump unit 70 is disclosed in U.S. Pat. No. 6,425,244, entitled "Pump Unit", which is assigned to the same assignee as the present invention and hereby incorporated by reference into the present application. This arrangement can achieve cost reduction thanks to communized parts and improved efficiency in assembling.

More preferably, the hydraulic pump unit 70 includes PTO unit 80 in the common pump housing 71 (see FIGS. 1 and 2). That is, the hydraulic pump unit 70 can be designed so that driving force input from the driving source 110 is divided into separate paths and respectively input into the first and second hydraulic pumps 10, 30, and PTO shaft 81. The PTO unit 80 preferably includes hydraulic clutch mechanism 85 for selectively switching power transmission and power shutdown between the driving source 110 and the PTO shaft 81, and hydraulic brake mechanism 86 for applying braking force in association with the power shutdown action by the hydraulic clutch mechanism 85 (see FIG. 2). Pressurized hydraulic fluid from the charge pump can be used as operating fluid to be fed into the hydraulic clutch mechanism 85 and the hydraulic brake mechanism 86 (see FIG. 2). This type of the hydraulic pump unit 70 is described in Japanese Patent Application No. 2002-101100, which was filed in the name of the same assignee as the present application and is hereby incorporated by reference into the present application.

Figure 4:
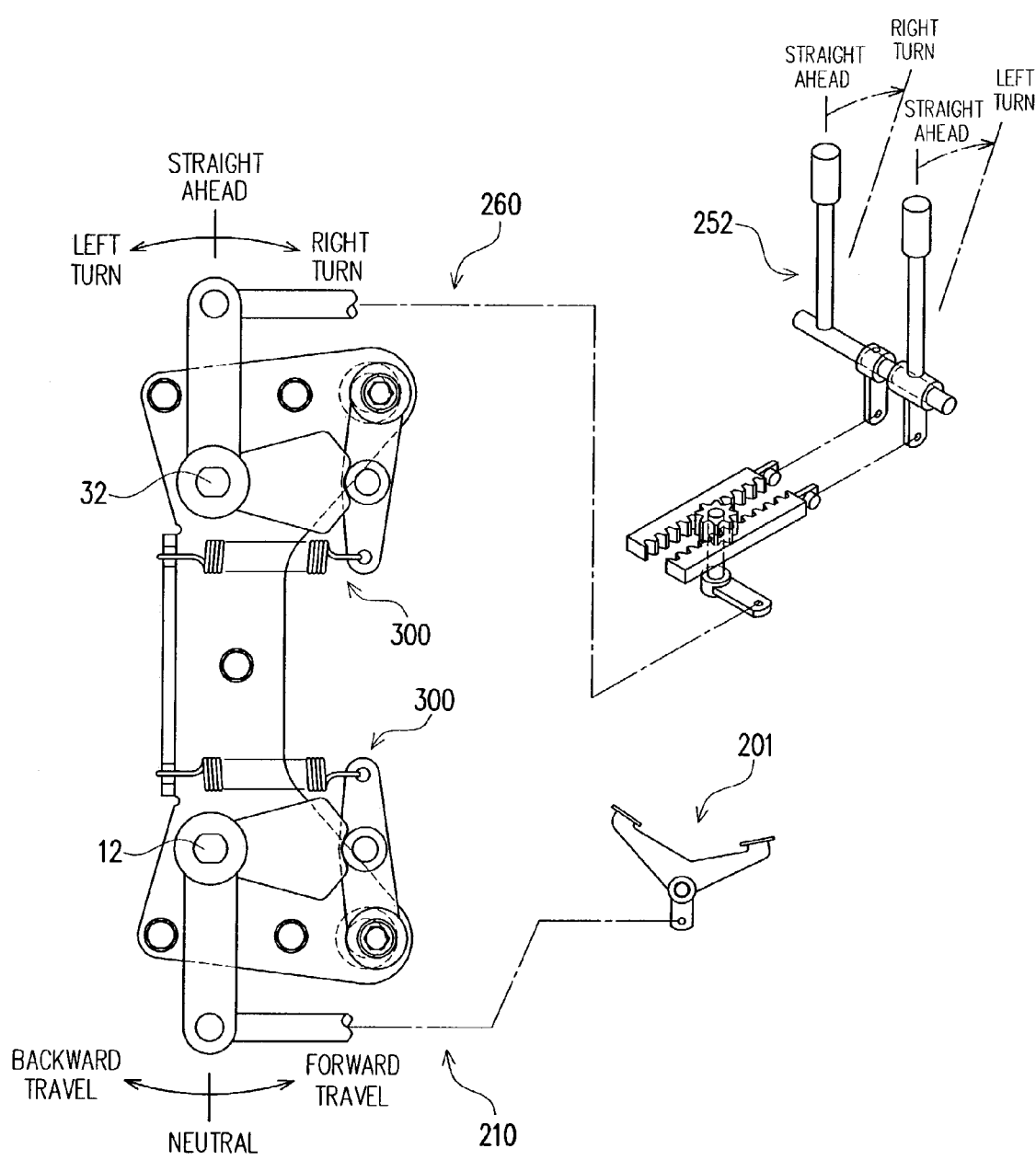
FIG. 4 is a model view illustrating another operation link mechanism between the first and second hydraulic pumps in the vehicle of FIG. 1.

FIG. 3 is a model view illustrating speed-change link mechanism 210 for operative connection between the driving-speed operation member and the output adjustment member 11 of the first hydraulic pump 10 enabling them to be operated in association with each other, and steering link mechanism 260 for operative connection between the steering operation member and the output adjustment member 31 of the second hydraulic pump 30 enabling them to be operated in association with each other. FIG. 4 illustrates a modified example of the steering operation member.

As illustrated in FIGS. 3 and 4, as the driving-speed operation member, it is possible to employ forward/reverse pedal 201 having a forward-travel pedal surface and a reverse-travel pedal surface, to which heel or toe pressure is applied by the driver. The speed-change link mechanism 210 is designed to be capable of tilting the output adjustment member 11 of the first hydraulic pump 10 from the neutral position to the first side and the second side based upon the operation of the driving-speed operation member. In the embodiment as illustrated in FIGS. 3 and 4, the first hydraulic pump 10 includes first control shaft 12 operatively connected to the output adjustment member 11 in such a manner as to be operated in association with each other, in which the first control shaft 12 is connected to the driving-speed operation member by the speed-change link mechanism 210.

The steering operation member may be in the form of such as steering wheel 251 (see FIG. 3) or right and left levers 252 (see FIG. 4) incorporated with a rack-and-pinion system. The steering link mechanism 260 is designed to be capable of tilting the output adjustment member 31 of the second hydraulic pump 30 from the neutral position to the first side and the second side based upon the operation of the steering operation member. In the embodiment as illustrated in FIGS. 3 and 4, the second hydraulic pump 30 includes second control shaft 32 operatively connected to the output adjustment member 31 in such a manner as to be operated in association with each other, in which the second control shaft 32 is connected to the steering operation member by the steering link mechanism 260. Reference numeral 300 in FIGS. 3 and 4 represents a neutral-position return mechanism for returning the output adjustment members 11, 31 of the first and second hydraulic pumps 10, 30 to the respective neutral positions.

Now, the description will be made for the operation of the vehicle equipped with the thus arranged hydraulic transmission 1A. First, the description will be made by taking for example the case where only the driving-speed operation member is operated without operation of the steering operation member.

By the operation of the driving-speed operation member, the output adjustment member 11 of the first hydraulic pump 10 is tilted from the neutral position to the first side or the second side. Accordingly, the first pair of hydraulic motors 20 are rotated in the same direction at the same speed, as described above. As a result, the vehicle 100A travels forward or backward. At this moment, the steering operation member is not being operated. Accordingly, the output adjustment member 31 of the second hydraulic pump 30 is held at the neutral position so that the second pair of hydraulic motors 40 are not driven.

Driving force of the first pair of hydraulic motors 20 enables, through the power transmission mechanisms 60, the second pair of hydraulic motors 40 to provide pumping action. However, since hydraulic fluid subsequently discharged from the second pair of hydraulic motors 40 merely circulates between the second pair of hydraulic motors 40 through the fluid passages 55, the first pair of hydraulic motors 20 is driven without interference of the discharged hydraulic fluid.

Now, the description will be made for the operation, in which only the steering operation member is operated without operation of the driving-speed operation member. By the operation of the steering operation member, the output adjustment member 31 of the second hydraulic pump 30 is tilted from the neutral position to the first side or the second side. Accordingly, the second pair of hydraulic motors 40 are rotated in the opposite directions at the same speed, as described above. As a result, the vehicle 100A turns about the turning point, that is, the midpoint between the right first wheel 150R and the left first wheel 150L in a direction corresponding to the direction to which the steering operation member is operated. At this moment, the output adjustment member 11 of the first hydraulic pump 10 is held at the neutral position so that the first pair of hydraulic motors 20 are not driven.

Driving force of the second pair of hydraulic motors 40 enables, through the power transmission mechanisms 60, the first pair of hydraulic motors 20 to provide pumping action. However, since hydraulic fluid subsequently discharged from the first pair of hydraulic motors 20 merely circulates between the first pair of hydraulic motors 20 through the fluid passages 50, the second pair of hydraulic motors 40 is driven without interference of the discharged hydraulic fluid.

Finally, the description will be made for the case, in which the steering operation member is operated while the driving-speed operation member is operated in either direction. When the steering operation member is operated with the driving-speed operation member tilted from the neutral position to the first or second side so as to move the vehicle 100a forward or backward, and with the first pair of hydraulic motors 20 rotating in the same direction as each other at the same speed, rotational power in the first rotational direction is input from one of the second pair of hydraulic motors 40 to a corresponding one of the first pair of hydraulic motors 20 and rotational power in the second rotational direction, which is opposite to the aforesaid first rotational direction, is input from the other of the second pair of hydraulic motors 40 to the other of the first pair of hydraulic motors 20 at the same speed. That is, each of the first pair of hydraulic motors 20 rotates while receiving resisting force having a different magnitude effected by a corresponding one of the second pair of hydraulic motors 40.

Specifically, when the steering operation member is tilted to the first side so as to turn the vehicle 100A to the right or left, one of the second pair of hydraulic motors 40, which is located within the turning radius, is rotated in the opposite direction to the rotational direction of a corresponding one of the first pair of hydraulic motors 20 (one of the first pair of hydraulic motors 20 located within the turning radius). Accordingly, the one of the first pair of hydraulic motors 20 receives higher rotational resistance.

On the other hand, the other of the second pair of hydraulic motors 40, which is located outside the turning radius, is rotated in the same direction as the rotational direction of the other of the first pair of hydraulic motors 20 (one of the first pair of hydraulic motors 20 located outside the turning radius). Accordingly, the other of the first pair of hydraulic motors 20, which is located outside the turning radius, receives lower rotational resistance. As a result, of the first pair of hydraulic motors 20, the rotation number of the one that is located outside the turning radius is higher than that of the one that is located within the turning radius, so that the vehicle gently turns.

Second Embodiment

Figure 5:
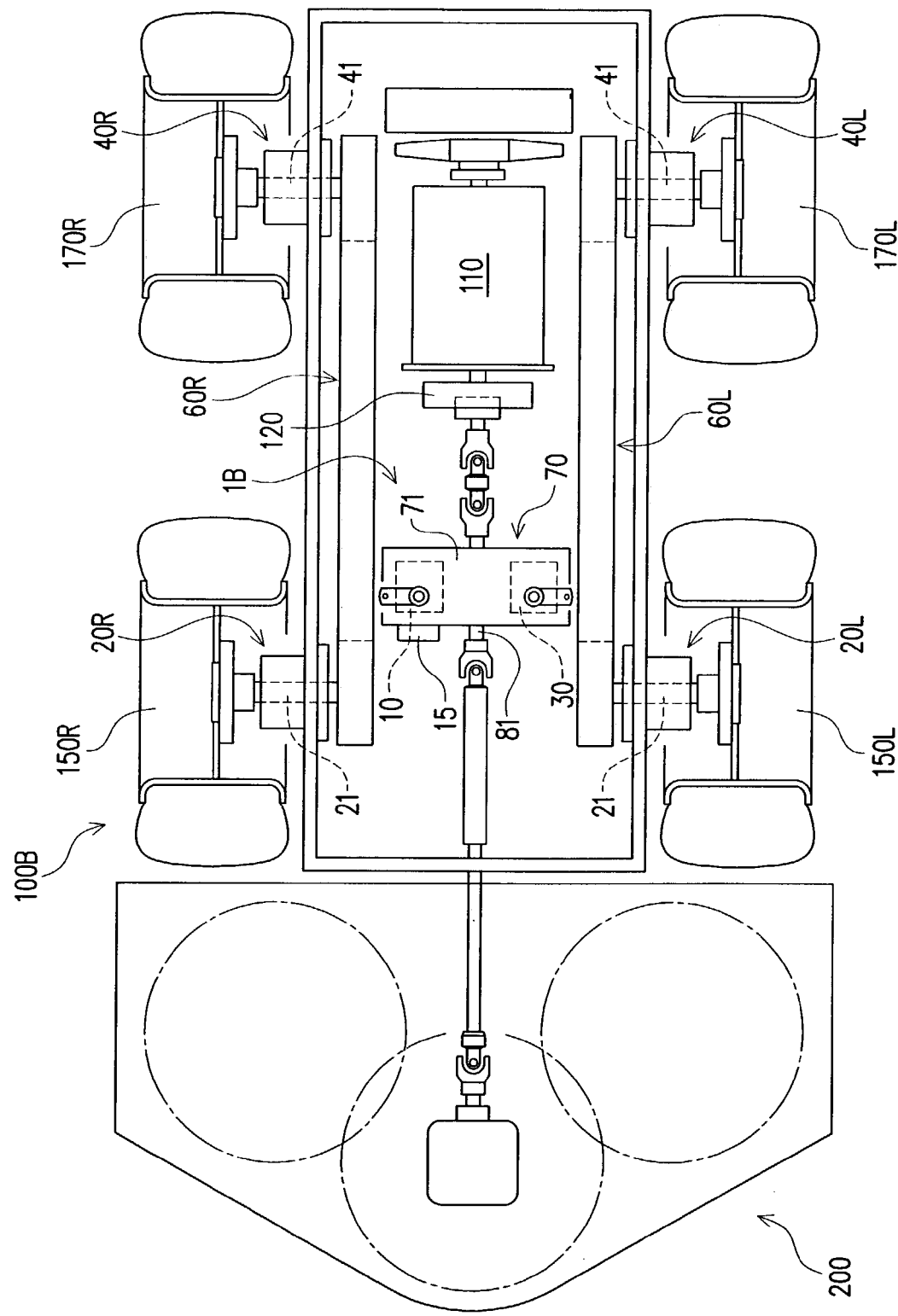
FIG. 5 is a plan model view of the vehicle, to which the hydraulic transmission of a second embodiment of the present invention has been applied.
Figure 6:
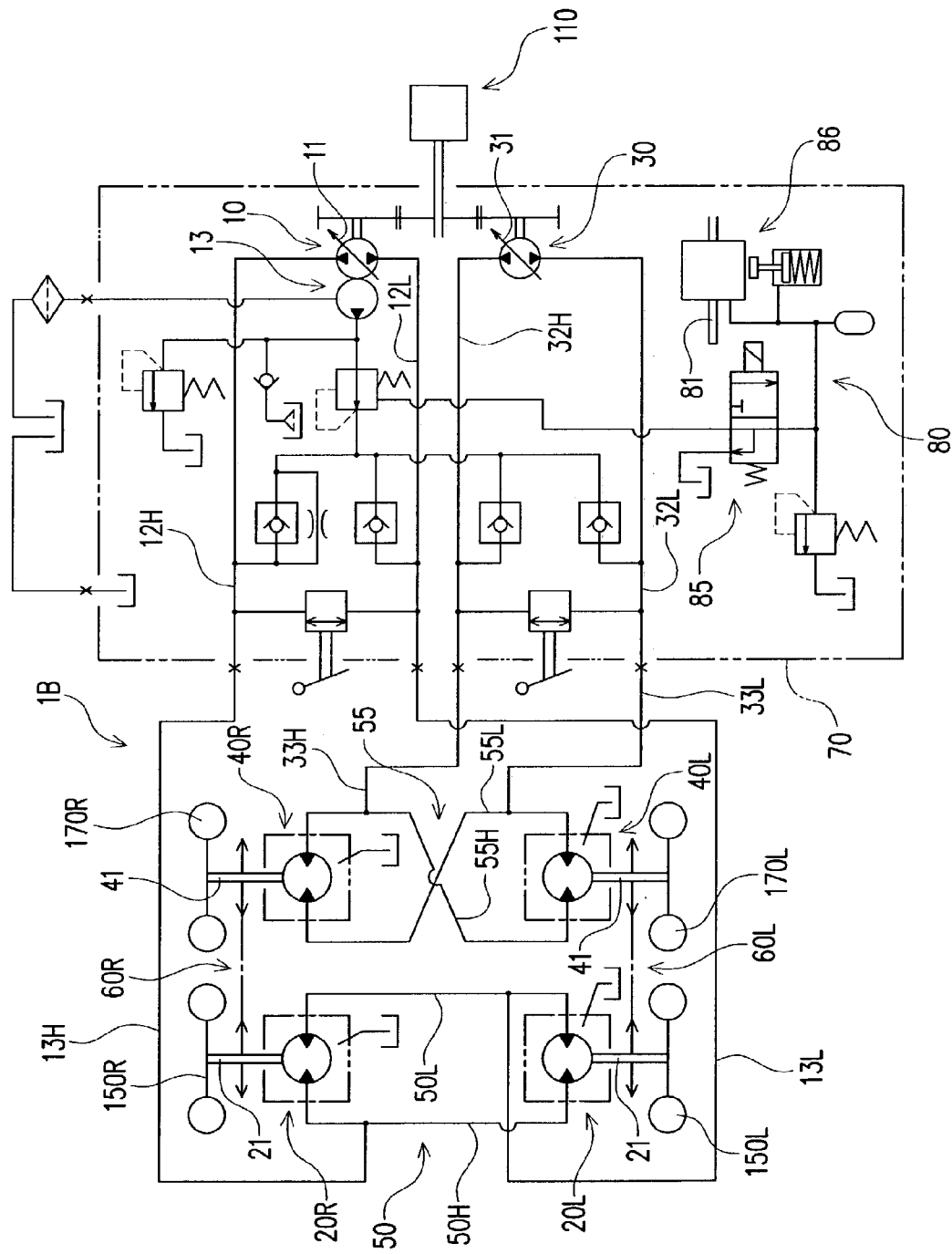
FIG. 6 is a hydraulic circuit diagram of the hydraulic transmission according to the second embodiment.

The description will be made for the hydraulic transmission according to the second embodiment of the present invention with reference to the accompanied drawings. FIGS. 5 and 6 are respectively a plan model view of the vehicle equipped with hydraulic transmission 1B of this embodiment, and a hydraulic circuit diagram of the hydraulic transmission 1B. In the following description, corresponding or identical parts to those of the first embodiment have been given the same reference characters to omit a detailed description thereof The vehicle as illustrated in FIG. 5 is different from the vehicle of the first embodiment in that a second pair of wheels 170, as well as the first pair of wheels 150 serve as driving and steering wheels. That is, the vehicle 100A as illustrated in FIG. 1 is a zero turn radius vehicle, which is provided with the first pair of wheels 150 as driving and steering wheels, and a pair of casters 160 disposed away from the first pair of wheels 150 in the fore and aft direction of the vehicle. On the contrary, the vehicle 100B as illustrated in FIG. 5 is a skid steer vehicle, in which the first pair of wheels 150 and the second pair of wheels 170 both serve as driving and steering wheels.

Specifically, as illustrated in FIGS. 5 and 6, the hydraulic transmission 1B of this embodiment has substantially the same construction as that of the hydraulic transmission 1A of the first embodiment except that the respective output shafts 41 of the second pair of hydraulic motors 40 are operatively connected to the second pair of wheels 170, as well as to the first pair of wheels 150. That is, in the hydraulic transmission 1B of this embodiment, the output shaft 41 of the left second hydraulic motor 40L is operatively connected to left second wheel 170L, while being operatively connected to the output shaft 21 of the left first hydraulic motor 20L. The output shaft 41 of the right second hydraulic motor 40R is operatively connected to right second wheel 170R, while being operatively connected to the output shaft 21 of the right first hydraulic motor 20R.

In the thus arranged hydraulic transmission 1B, it is possible to drive the first pair of wheels 150 and the second pair of wheels 170 with variable speed while steering the same. That is, while achieving four-wheel driving, the same effects as those in the first embodiment can be produced. In this embodiment, the crossing point of a phantom line between the right first wheel 150R and the left second wheel 170L and a phantom line between the left first wheel 150L and the right second wheel 170R is designated as the turning center of them.

Working unit 200 driven by the PTO shaft 81 may be mid-mounted between the first pair of wheels 150 and the second pair of wheels 170 (see FIG. 1), or may be front-mounted between the first pair of wheels 150 and the second pair of wheels 170. Also, it is a matter of course that the vehicle can be equipped with a sediment bucket, auger for snow removal or any other type of working units instead of the mower unit.

Third Embodiment

Figure 7:
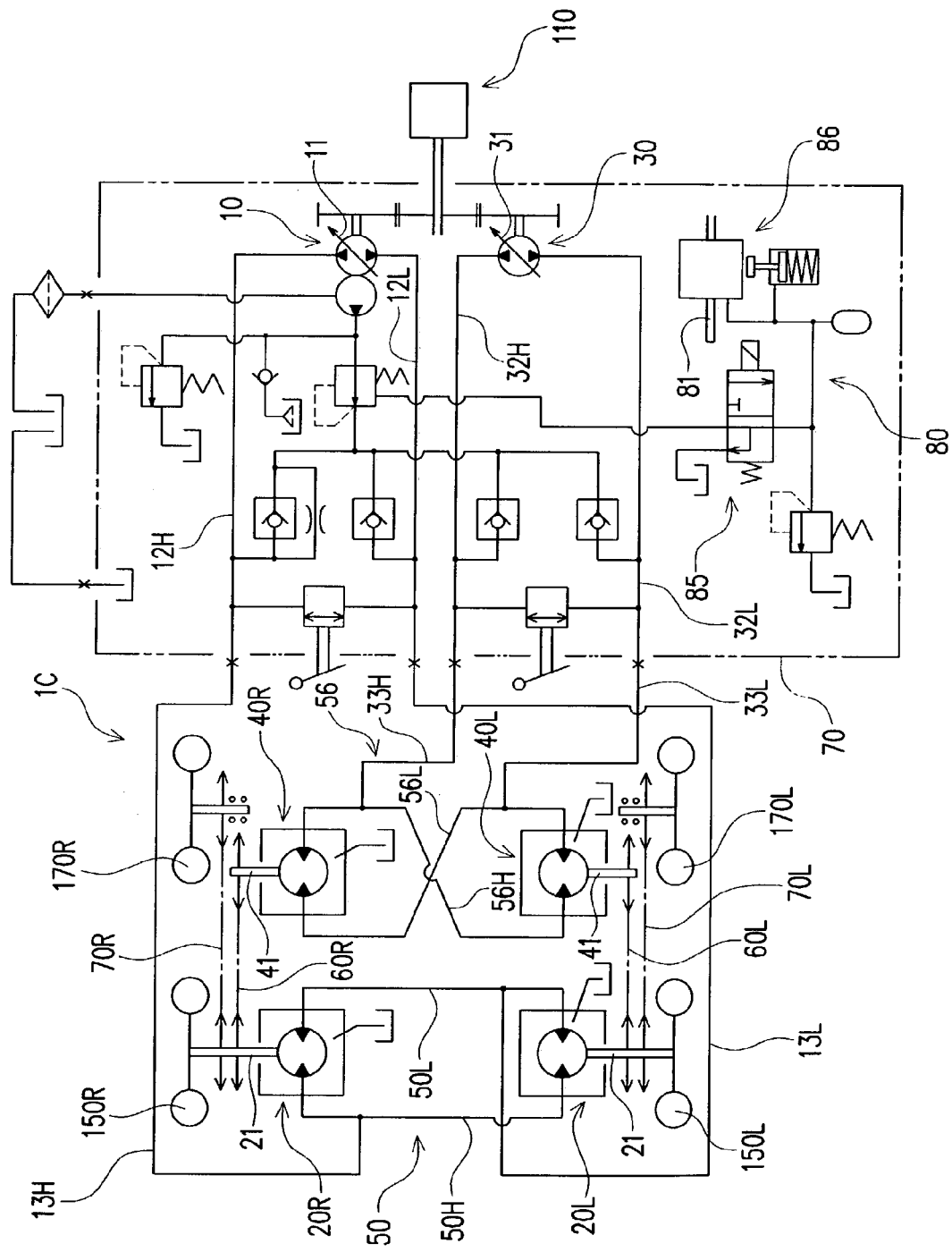
FIG. 7 is a hydraulic circuit diagram of the hydraulic transmission according to a third embodiment of the present invention.

The description will be made for the hydraulic transmission according to the third embodiment of the present invention with reference to the accompanied drawings. FIG. 7 is a hydraulic circuit diagram of hydraulic transmission 1C of this embodiment. In the following description, corresponding or identical parts to those of the first and second embodiments have been given the same reference characters to omit a detailed description thereof.

Likewise to the vehicle 100B as illustrated in FIG. 5, the hydraulic transmission 1C of this embodiment is applied to a skid steer vehicle, in which the first pair of wheels 150 and the second pair of wheels 170 both serve as driving and steering wheels.

As illustrated in FIG. 7, in the hydraulic transmission 1C of this embodiment, the output shaft 21 of the left first hydraulic motor 20L, which is operatively connected to the left first wheel 150L, is operatively connected to the left second wheel 170L via power transmission mechanism 70L, while being operatively connected to the output shaft 41 of the left second hydraulic motor 40L via the power transmission mechanism 70L. Also, the output shaft 21 of the right first hydraulic motor 20R, which is operatively connected to the right first wheel 150R, is operatively connected to the right second wheel 170R via power transmission mechanism 70R, while being operatively connected to the output shaft 41 of the right second hydraulic motor 40R via the power transmission mechanism 70R.

In the thus arranged hydraulic transmission 1C, it is possible to drive the first pair of wheels 150 and the second pair of wheels 170 with variable speed while steering the same, in the same manner as the second embodiment. That is, while achieving four-wheel driving, the same effects as those in the second embodiment can be produced. Also, since there is provided another power transmission mechanism 70 for driving the second pair of wheels in addition to the first pair of wheels 150, the hydraulic transmission of the present invention can be applied to a wide field of applications such as a six-wheel vehicle or eight-wheel vehicle.

Fourth Embodiment

Figure 8:
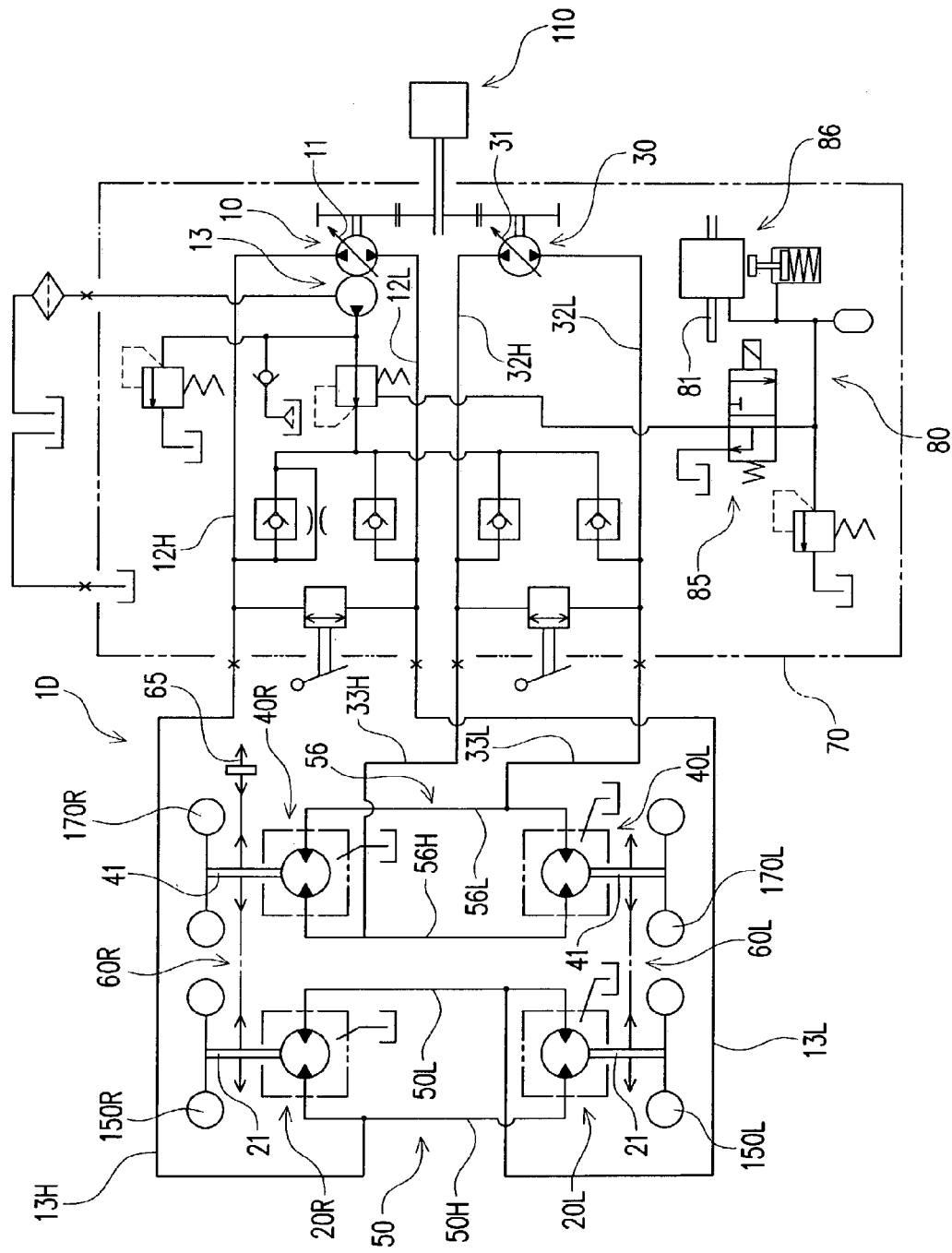
FIG. 8 is a hydraulic circuit diagram of the hydraulic transmission according to a fourth embodiment of the present invention.

The description will be made for the hydraulic transmission according to the fourth embodiment of the present invention with reference to the accompanied drawings. FIG. 8 is a hydraulic circuit diagram of hydraulic transmission 1D of this embodiment. In the following description, corresponding or identical parts to those of the first and second embodiments have been given the same reference characters to omit a detailed description thereof.

As illustrated in FIG. 8, in the hydraulic transmission 1D of this embodiment, the fluid passages between the second pair of hydraulic motors 40 are modified to parallel passages 56. Also, the hydraulic transmission 1D of this embodiment is different from the hydraulic transmission of the second embodiment in that the transmission direction of the right power transmission mechanism 60R is opposite to that of the left power transmission mechanism 60L.

That is, in the hydraulic transmission 1D of this embodiment, the inlet/outlet ports of the second pair of hydraulic motors 40 are respectively connected with the parallel passages 56. Also, the inlet/outlet ports of the second hydraulic pump 30 are respectively and fluidly connected to fluid passage 56H and fluid passage 56L of the parallel passages 56.

Either one of the right power transmission mechanism 60R and the left power transmission mechanism 60L is provided with rotational-direction switching member 65 (e.g., an idle sprocket in a chain drive system) for reversing the rotational direction. In FIG. 8, the right power transmission mechanism 60R is provided with this member. In the thus arranged hydraulic transmission 1D, it is possible to produce the same effects as those of the second embodiment, although the hydraulic transmission of this embodiment is provided with the rotational-direction switching member 65.

This specification is by no means intended to restrict the present invention to the preferred embodiments set forth therein. Various modifications to the hydraulic transmission as described herein, may be made by those skilled in the art without departing from the spirit and scope of the present invention as defined in the appended claims.

What is claimed is:

1. A hydraulic transmission for driving and steering wheels of a vehicle, said vehicle having at least a first pair of laterally disposed wheels comprising:
    a first pair of hydraulic motors having output shafts respectively and drivingly connected to said first pair of laterally disposed wheels, and having inlet/outlet ports fluidly connected to each other with parallel fluid passages;
    a second pair of hydraulic motors having output shafts each operatively connected to a corresponding one of said output shafts of said first pair of hydraulic motors, and having inlet/outlet ports fluidly connected to each other with fluid passages;
    a first hydraulic pump operatively connected to a driving source and having inlet/outlet ports respectively and fluidly connected to a high pressure side and a low pressure side of the parallel fluid passages;
    a second hydraulic pump operatively connected to said driving source and having inlet/outlet ports respectively and fluidly connected to a high pressure side and a low pressure side of said fluid passages between said second pair of hydraulic motors; wherein
    said first hydraulic pump is of a variable displacement type that varies the amount of hydraulic fluid to be discharged and supplied, based upon the displacement amount of a first output adjustment member, said displacement amount being varied by operating said first output adjustment member via a driving-speed operation member;
    said second hydraulic pump is of a variable displacement type that varies the amount of hydraulic fluid to be discharged and sucked, based upon the displacement amount of a second output adjustment member, said displacement amount being varied by operating said second output adjustment member via a steering operation member; and
    rotational power is input from each of said second pair of hydraulic motors to a corresponding one of the output shafts of the first pair of hydraulic motors by a magnitude corresponding to the operational amount of the steering operation member in a different rotational direction from each other.

2. A hydraulic transmission according to claim 1, wherein said inlet/outlet ports of said second pair of hydraulic motors are connected to each other with crossed fluid passages, and the direction in which power is transmitted from one of the output shafts of said second pair of hydraulic motors to a corresponding one of said output shafts of said first pair of hydraulic motors is the same as the direction in which power is transmitted from the other of the output shafts of said second pair of hydraulic motors to the other of the output shafts of said first pair of hydraulic motors.

3. A hydraulic transmission according to claim 1, wherein said inlet/outlet ports of said second pair of hydraulic motors are connected to each other with parallel fluid passages, and the direction in which power is transmitted from one of the output shafts of said second pair of hydraulic motors to a corresponding one of said output shafts of said first pair of hydraulic motors is opposite to the direction in which power is transmitted from the other of the output shafts of said second pair of hydraulic motors to the other of the output shafts of said first pair of hydraulic motors.

4. A hydraulic transmission according to claim 1, wherein the vehicle further has a second pair of laterally disposed wheels, and the output shafts of said second pair of hydraulic motors are respectively and drivingly connected to said second pair of laterally disposed wheels.

5. A hydraulic transmission according to claim 1, wherein the vehicle further has a second pair of laterally disposed wheels, and the output shafts of said first pair of hydraulic motors are respectively and drivingly connected to said second pair of laterally disposed wheels.

6. A hydraulic transmission according to claim 1, wherein said first hydraulic pump is provided with a neutral-position return mechanism for returning said first output adjustment member to a neutral position thereof when said driving-speed operation member has been released from the operational state.

7. A hydraulic transmission according to claim 1, wherein said second hydraulic pump is provided with a neutral-position return mechanism for returning said second output adjustment member to a neutral position thereof when said steering operation member has been released from the operational state.

8. A hydraulic transmission according to claim 1, wherein said first and second hydraulic pumps are accommodated within a common pump housing so as to together constitute a hydraulic pump unit.

9. A hydraulic transmission according to claim 1, further comprising a charge pump for being operatively driven by said driving source.

10. A hydraulic transmission according to claim 8, wherein said hydraulic pump unit includes a PTO unit.

11. A hydraulic transmission equipped with a first HST and a second HST, into which driving force from a driving source is input, so as to drive and steer wheels of a vehicle, said vehicle having at least a first pair of laterally disposed wheels, wherein said first HST comprising:
a first hydraulic pump operatively connected to said driving source, said first hydraulic pump being of a variable displacement type that varies the amount of hydraulic fluid to be discharged and supplied, based upon the displacement amount of a first output adjustment member, said displacement amount being varied by operating said second output adjustment member via a driving-speed operation member;
a first pair of hydraulic motors having output shafts respectively and drivingly connected to said first pair of laterally disposed wheels, and having inlet/outlet ports fluidly connected to each other with first parallel fluid passages; and
first conduits for fluid connection between inlet/outlet ports of said first hydraulic pump and said first parallel fluid passages; wherein
said second HST comprising:
a second hydraulic pump operatively connected to said driving source, said second hydraulic pump being of a variable displacement type that varies the amount of hydraulic fluid to be discharged and supplied, based upon the displacement amount of a second output adjustment member, said displacement amount being varied by operating said second output adjustment member via a steering operation member;
a second pair of hydraulic motors having output shafts each operatively connected to a corresponding one of said output shafts of said first pair of hydraulic motors, and having inlet/outlet ports fluidly connected to each other with second fluid passages; and
second conduits for fluid connection between inlet/outlet ports of said second hydraulic pump and said second fluid passages; wherein
rotational power is input from each of said output shafts of said second pair of hydraulic motors to a corresponding one of the output shafts of the first pair of hydraulic motors by a magnitude corresponding to the operational amount of the steering operation member in a different rotational direction from each other.

12. A hydraulic transmission according to claim 11, wherein:
said second fluid passages are designed so as to connect said inlet/outlet ports of said second pair of hydraulic motors in a crosswise manner to each other;
said hydraulic transmission further comprising:
a first power transmission mechanism for operatively connecting one of said output shafts of said second pair of hydraulic motors to a corresponding one of said output shafts of said first pair of hydraulic motors, enabling them to be operated in association with each other; and
a second power transmission mechanism for operatively connecting the other of said output shafts of said second pair of hydraulic motors to the other of said output shafts of said first pair of hydraulic motor, enabling them to be operated in association with each other; wherein
the power transmission direction of said first power transmission mechanism is the same as that of said second power transmission mechanism.

13. A hydraulic transmission according to claim 11, wherein:
said second fluid passages are designed so as to connect said inlet/outlet ports of said second pair of hydraulic motors in parallel to each other;
said hydraulic transmission further comprising:
a first power transmission for operatively connecting one of said output shafts of said second pair of hydraulic motors to a corresponding one of said output shafts of said first pair of hydraulic motors, enabling them to be operated in association with each other; and
a second power transmission for operatively connecting the other of said output shafts of said second pair of hydraulic motors to the other of said output shafts of said first pair of hydraulic motors, enabling them to be operated in association with each other; wherein
the power transmission direction of said first power transmission mechanism is different from that of said second power transmission mechanism.

14. A hydraulic transmission according to claim 11, wherein the vehicle further has a second pair of laterally disposed wheels, and the output shafts of said second pair of hydraulic motors are respectively and drivingly connected to said second pair of laterally disposed wheels.

15. A hydraulic transmission according to claim 11, wherein the vehicle further has a second pair of laterally disposed wheels, and the output shafts of said first pair of hydraulic motors are respectively and drivingly connected to said second pair of laterally disposed wheels.

16. A hydraulic transmission according to claim 11, wherein said first hydraulic pump is provided with a neutral-position return mechanism for returning said first output adjustment member to a neutral position thereof when said driving-speed operation member has been released from the operational state.

17. A hydraulic transmission according to claim 11, wherein said second hydraulic pump is provided with a neutral-position return mechanism for returning said second output adjustment member to a neutral position thereof when said steering operation member has been released from the operational state.

18. A hydraulic transmission according to claim 11, wherein said first and second hydraulic pumps are accommodated within a common pump housing so as to together constitute a hydraulic pump unit.

19. A hydraulic transmission according to claim 11, further comprising a charge pump for being operatively driven by said driving source.

20. A hydraulic transmission according to claim 18, wherein said hydraulic pump unit includes a PTO unit.

* * * * *